United States Patent
Ukraintsev et al.

(10) Patent No.: US 7,465,689 B2
(45) Date of Patent: Dec. 16, 2008

(54) METHOD FOR PRODUCING A PALLADIUM-CONTAINING HYDROGENATION CATALYST

(76) Inventors: Valery Borisovich Ukraintsev, d. 15, kv.41, Sekri-petz burg, ul. Turku (RU) 197228; Konstantin Anatolievich Khokhryakov, d. 33, kv. 22, Saint-Petersburg, ul. Chaikovskogen (RU) 191123; Nikolai Zakharovich Sobolev, d.105, korp. 3, Saint-Petersburg, Grazhdansky pr. (RU) 19567; Georgy Andreevich Dyuzhev, d. 69, kv. 47, Saint-Petersburg, pr. Engelsa (RU) 194017; Vladimir Mikhailovich Prokofiev, d. 69, kv. 47, Saint-Petersburg, ul. S-ya Krasnoamoisakayo (RU) 195005

( * ) Notice: Subject to any disclaimer, the term of this patent is extended or adjusted under 35 U.S.C. 154(b) by 287 days.

(21) Appl. No.: 10/564,019
(22) PCT Filed: Jul. 6, 2004
(86) PCT No.: PCT/RU2004/000263
§ 371 (c)(1), (2), (4) Date: Jan. 9, 2006
(87) PCT Pub. No.: WO2005/007288
PCT Pub. Date: Jan. 27, 2005

(65) Prior Publication Data
US 2006/0205589 A1    Sep. 14, 2006

(30) Foreign Application Priority Data
Jul. 10, 2003    (RU) .................... 2003122564

(51) Int. Cl.
B01J 21/18    (2006.01)
B01J 23/40    (2006.01)
B01J 19/08    (2006.01)
D01F 9/12    (2006.01)
D01F 9/127    (2006.01)
C01B 31/02    (2006.01)

(52) U.S. Cl. .......... 502/185; 423/447.1; 423/445 B; 423/DIG. 39; 423/DIG. 40; 977/734; 977/735; 977/740; 977/742; 977/748

(58) Field of Classification Search .......... 502/185; 423/447.1, 445 B, DIG. 39, DIG. 40; 977/734, 977/735, 740, 742, 748
See application file for complete search history.

(56) References Cited

U.S. PATENT DOCUMENTS

| | | | |
|---|---|---|---|
| 3,138,560 A * | 6/1964 | Bair et al. ............. | 502/185 |
| 3,457,187 A * | 7/1969 | Trebra Jr. et al. ....... | 502/170 |
| 4,031,292 A * | 6/1977 | Hervert ................ | 502/101 |
| 4,621,150 A * | 11/1986 | Hirai et al. ............ | 560/51 |
| 5,258,048 A * | 11/1993 | Whewell ............... | 44/282 |
| 5,273,729 A * | 12/1993 | Howard et al. .......... | 423/445 B |
| 5,380,560 A * | 1/1995 | Kaja et al. ............. | 427/306 |
| 5,543,378 A * | 8/1996 | Wang .................. | 502/174 |
| 6,471,929 B1 * | 10/2002 | Kusunoki et al. ........ | 423/245.3 |

FOREIGN PATENT DOCUMENTS

WO    WO 95/10481    *    4/1995

OTHER PUBLICATIONS

"Catalytic Hydrogenation of acetylenic alcohols using palladium complex of fullerene C60," E. Sulman et al. Journal of Molecular Catalysis A: Chemical 146 (1999), pp. 257-263.*

"Electrochemically formed two-component films comprised of fullerene and transition-metal components," Krzysztof Winkler et al. C. R. Chimie 9 )2006), pp. 924-943.*

"Fullerenes and Fullerites: New Forms of Carbon," Wolfgang Kratschmer. Synthetic Metals 70 (1995), pp. 1309-1312.*

* cited by examiner

Primary Examiner—Jerry Lorengo
Assistant Examiner—Patricia L Hailey
(74) Attorney, Agent, or Firm—John D. Gugliotta, PE, Esq

(57) ABSTRACT

The invention relates to physical chemistry and can be used for adjusting the rate of autocatalytic hydrogenation reactions.

The method for producing a palladium-containing hydrogenation catalyst consists in reducing divalent palladium from the initial compound thereof and precipitating the thus reduced palladium on a carbon material, wherein, according to said invention, the initial compound is embodied in the form of tetra aqua-palladium (II) perchlorate. The reduced palladium is precipitated on a nano-carbon material which can be embodied in the form of fullerene $C_{60}$, carbon nanotubes, cathodic deposit and the mixture of $C_{60}$ and $C_{70}$ fullerenes at the following ratio thereof: 60-80 mass % fullerene $C_{60}$ and 20-40 mass % fluorine $C_{70}$.

The invention makes it possible to develop the method for producing a palladium-containing hydrogenation catalyst which exhibits a higher catalytic activity and operates in softer conditions (at a room temperature and a normal (atmospheric) pressure).

5 Claims, 3 Drawing Sheets

METHOD FOR PRODUCING A PALLADIUM-CONTAINING HYDROGENATION CATALYST

TECHNICAL FIELD

The invention relates to physical chemistry and can be used for adjusting the rate of autocatalytic hydrogenation reactions.

BACKGROUND ART

The hydrogenation reactions relate to basic industrial processes that are usually realized over a catalyst, in particular, for the synthesis of alicyclic and cyclic saturated organic compounds, high-quality benzine, etc.

According to the written publications known in the art (see Grove D. E. Plat. Met., 2002, 46, (2) 92), about 75% of the industrial hydrogenation processes are realized over the Pd/C catalyst, which contains 5% of metal palladium. The rich variety of palladium's catalytic properties allows using it in almost all reactions necessary for the organic synthesis. Therefore, at present, Pd/C is the most suitable system for realizing the processes of the catalytic organic synthesis.

A known method for producing a palladium-containing hydrogenation catalyst consists in reducing divalent palladium from the initial compound thereof and precipitating the thus reduced palladium on a carbon material, wherein the initial compounds are embodied in the form of Pd (II) complexes, see Tsuji J. Palladium reagents and catalysts-innovations in organic syntheses. John Wiley & sons, Chichester. 1995. 595 p.; Grove D. E. Plat. Met., 2002, 46, (1) 48.

Another known method for producing a palladium-containing hydrogenation catalyst consists in reducing divalent palladium from the initial compound thereof and precipitating the thus reduced palladium on a carbon material, wherein the initial compound in embodied in the form of palladium chloride (II), see H. M. Colquhoun, Y. Holton, et alii, "New Pathways for Organic Synthesis" («Новые путиорганическогосинтеза»), translated from English by M. S. Ermolenko and V. G. Kiseleva, Moscow, «Химия»("Chemistry"), 1989, 361 p., 2$^{nd}$ paragraph counting from the top of the page.

The palladium chloride (8.2 g) solution in hydrochloric acid (20 ml of concentrated acid in 50 ml of water) is heated during 2 hours, then added, while constantly stirring, to a hot (80° C.) coal suspension in water (93 g of coal in 1.2 l of water), wherein the coal has previously been washed with nitric acid.

Coal of almost any type can be used, provided that said coal has a sufficiently large specific surface area, has been washed with nitric acid (10%) during 2-3 hours, subsequently washed with water in order to eliminate the acid, and dried at 100° C. Then the formaldehyde is added (8 ml of 37% solution) and subsequently the sodium hydroxide solution is added until a strong alkaline reaction is achieved. After 10 minutes the thus obtained catalyst is filtered out, washed with water (10×250 ml) and vacuum dried over calcium chloride. The palladium outlet equals 5% for 93-98% coal.

This method is taken as a prototype of the present invention.

The disadvantage of said method is in that the catalyst produced according to this method exhibits a low catalytic activity and operates only at high temperatures (higher than 60° C.) and high pressure (higher than 5 gauge atmospheres).

The reason for said disadvantage is the difficulty of activation of the reaction centers of the catalyst produced according to the prototype method.

SUMMARY OF THE INVENTION

It is an object of this invention to develop a method for producing a palladium-containing hydrogenation catalyst, which exhibits a higher catalytic activity and operated in softer conditions (at a room temperature and a normal (atmospheric) pressure).

According to the present invention there is provided a method for producing a palladium-containing hydrogenation catalyst, which consists in reducing divalent palladium from the initial compound thereof and precipitating the thus reduced palladium on a carbon material, wherein the initial compound is embodied in the form of tetra aqua-palladium (II) perchlorate. The reduced palladium is precipitated on a nano-carbon material which can be embodied in the form of fullerene $C_{60}$, carbon nanotubes, cathodic deposit and the mixture of $C_{60}$ and $C_{70}$ fullerenes at the following ratio thereof: 60-80 mass % fullerene $C_{60}$ and 20-40 mass % fullerene $C_{70}$.

The applicant hasn't found any sources of information containing data on engineering solutions identical to the present invention. In applicant's opinion, that enables to conclude that the invention conforms to the criterion "novelty" (N).

The distinguishing characteristics of the present invention enable to achieve an important engineering result, which consists in that the embodiment of the initial compound in the form of tetra aqua-palladium (II) perchlorate allows producing reduced palladium with high dispersion ability, and the precipitation of the reduced palladium on a nano-carbon material allows keeping the palladium in nano-clustered form.

Said conditions significantly increase the catalytic activity of the substance produced by the realization of said method and make it possible to conduct the catalysis process at a room temperature and normal atmospheric pressure.

The applicant hasn't found any sources of information containing data on the influence of said distinguishing characteristics on the engineering result achieved through the application thereof. In applicant's opinion, that enables to conclude that the invention conforms to the criterion "inventive step" (IS).

BRIEF DESCRIPTION OF THE DRAWINGS

The present invention is illustrated, by way of example, with reference to the accompanying drawings in which.

$$C_2H_4 + H_2 \rightarrow C_2H_6; \tag{1}$$

$$CH_2=CHCH_2OH + H_2 \rightarrow CH_3CH_2CH_2OH; \tag{2}$$

$$2Fe_{aq}^{+3} + H_2 \rightarrow 2Fe_{aq}^{+2} + 2H^+. \tag{3}$$

Figure 1:
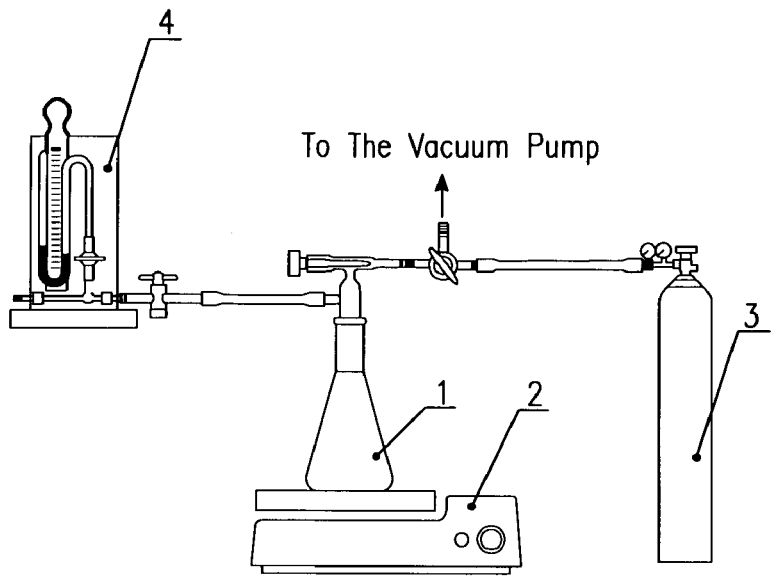
FIG. 1 is a scheme of the plant for the realization of the inventive method for producing a palladium-containing hydrogenation s catalyst.
Figure 2:
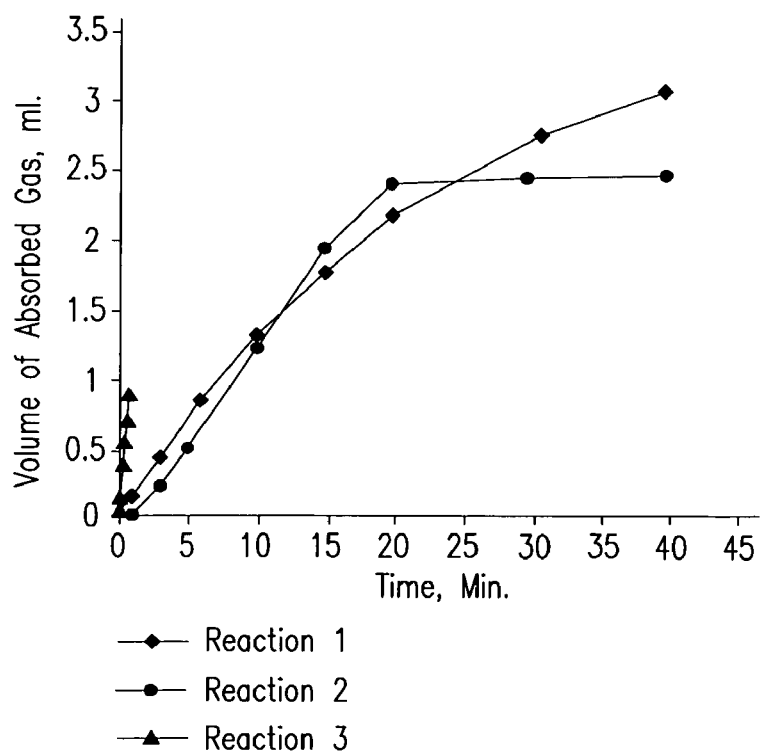
FIG. 2 is a time graph of the volume of the absorbed gas mixture for various hydrogenation reactions over a catalyst produced by means of the method according to claim 2.
Figure 3:
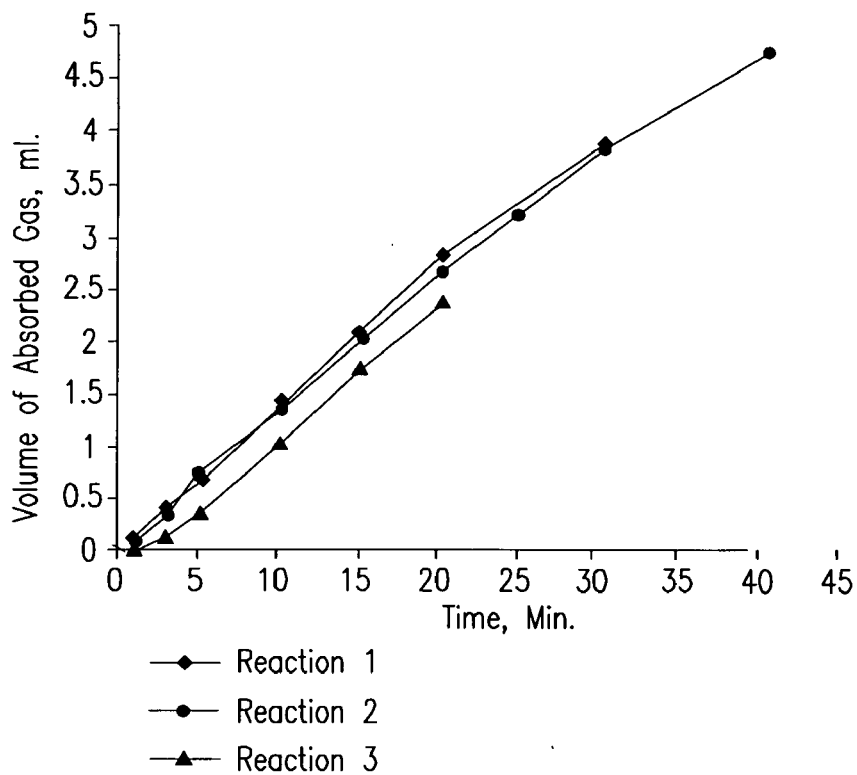
Figure 4:
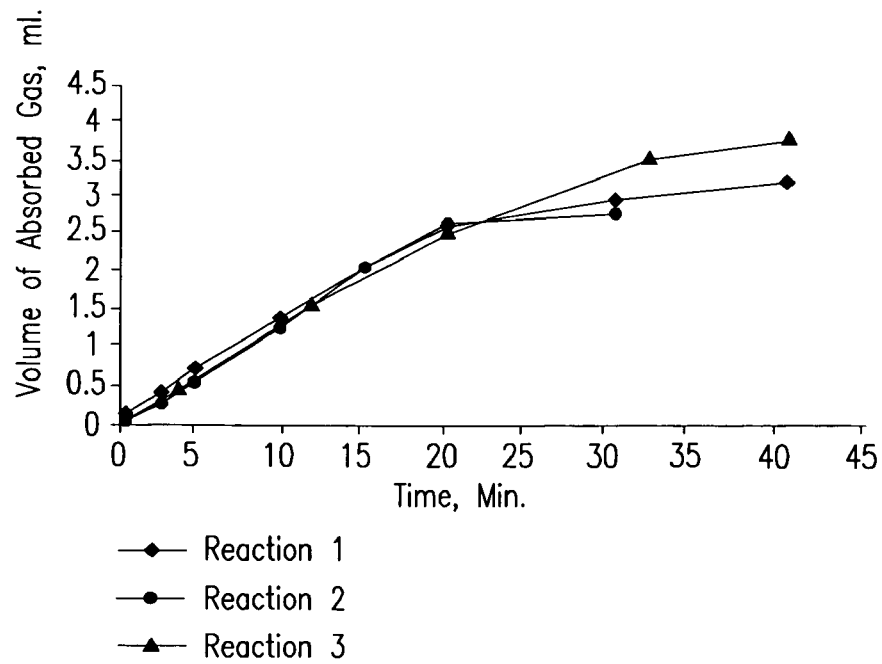
Figure 5:
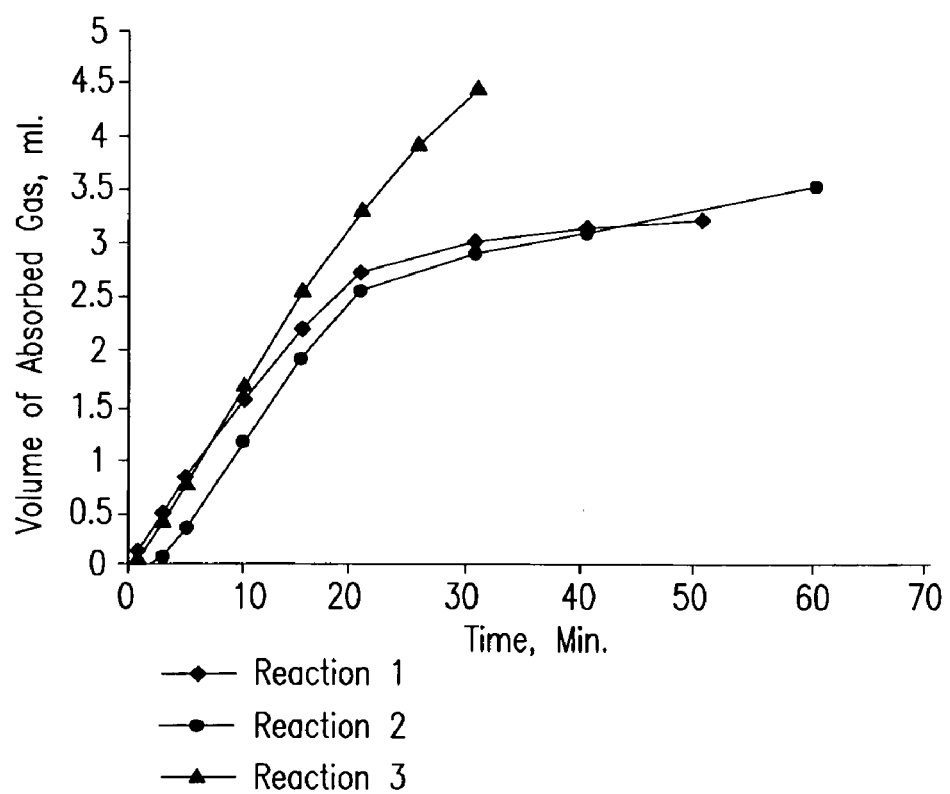

FIG. 3 is identical to FIG. 2, but the catalyst is produced by means of the method according to claim 3;

FIG. 4 is identical to FIG. 2, but the catalyst is produced by means of the method according to claim 4;

FIG. 5 is identical to FIG. 2, but the catalyst is produced by means of the method according to claim 5.

PREFERRED EMBODIMENT

The plant for realization of the inventive method comprises a reactor 1 provided with a mixer 2. Hydrogen is contained in the cylinder 3. The reactor 1 is connected to the manometric plant 4.

In the first specific embodiment the method is realized in the following way.

2.0 liters of distilled water are placed in the reactor 1. Then 600 mg of nano-carbon material are introduced, in particular, fullerene $C_{60}$. Then 5.22 ml of $5.7 \cdot 10^{-2}$ m $[Pd(H_2O)_4(ClO_4)_2$ solution are added, said solution containing 0.7 m of chloric acid, and the mixture is stirred during 0.5 hour. Then the divalent palladium is reduced by passing it through the prepared hydrogen solution during 2 hours.

The sediment is filtered out by means of the Shott filter, repeatedly washed with distilled water and dried in a vacuum desiccator over $P_2O_5$ during 2 days (48 hours). The catalyst outlet equalled 98-99% (catalyst I).

The second specific embodiment (catalyst II) differs from the first one only in that the nano-carbon material is embodied in the form of carbon nanotubes; in the third specific embodiment (catalyst III) the nano-carbon material is embodied in the form of cathodic deposit; in the fourth specific embodiment (catalyst IV) the nano-carbon material is embodied in the form of the mixture of $C_{60}$ and $C_{70}$ fullerenes at the following ratio thereof:

fullerene $C_{60}$—60-80 mass %
fullerene $C_{70}$—20-40 mass %

Each catalyst produced was tested in all three hydrogenation reactions mentioned above. For this, 10 mg of catalyst were placed in the solution and then corresponding substance was added: 10 ml of distilled water for reaction (1), 10 ml of 0.01 aqueous solution of ferric sulphate for reaction (2), 10 ml of 0.002 aqueous solution of allyl alcohol for reaction (3). For reaction (1), the reactor was filled with the mixture of ethylene and hydrogen at the volume ratio of 1:1; for reactions (2) and (3), the reactor was filled with hydrogen. The reactions were conducted at a temperature of 18-25° C. and a normal atmospheric pressure. The rates of the reaction (1), (2) and (3) were measured by the time variation of the absorbed gases' volume over the catalysts I, II, III, IV (see FIGS. 2, 3, 4, 5 respectively).

For comparison purposes, the rates of the hydrogenation reactions, conducted in similar conditions, but over industrial catalyst Pd/C, were measured. In reaction (1) the rate did not exceed 10-12% of the hydrogenation rate over catalysts I, II, III, IV, in reaction (2) almost no hydrogenation was observed, in reaction (3) no difference in the hydrogenation rate was observed.

INDUSTRIAL APPLICABILITY

Known simple industrial equipment and materials common in the art are used for the realization of the method, which enables to conclude that the invention conforms to the criterion "industrial applicability" (IA).

The invention claimed is:

1. A method for producing a palladium-containing hydrogenation catalyst, consisting in reducing divalent palladium from the initial compound thereof and precipitating the thus reduced palladium on a carbon material, characterized that the initial compound is embodied in the form of tetra aquapalladium (II) perchlorate, and the reduced palladium is precipitated on a nano-carbon material.

2. A method according to claim 1, characterized in that the nano-carbon material is embodied in the form of fullerene $C_{60}$.

3. A method according to claim 1, characterized in that the nano-carbon material is embodied in the form of carbon nanotubes.

4. A method according to claim 1, characterized in that the nano-carbon material is embodied in the form of a cathodic deposit.

5. A method according to claim 1, characterized in that the nano-carbon material is embodied in the form of the mixture of $C_{60}$ and $C_{70}$ fullerenes at the following ratio thereof:

fullerene $C_{60}$—60-80 mass %
fullerene $C^{70}$—20-40 mass %.

* * * * *